G. W. PARKER.
Speed Regulators.

No. 138,522. Patented May 6, 1873.

Witnesses:

Inventor:
George W. Parker

UNITED STATES PATENT OFFICE.

GEORGE W. PARKER, OF GARDNER, MASSACHUSETTS.

IMPROVEMENT IN SPEED-REGULATORS.

Specification forming part of Letters Patent No. 138,522, dated May 6, 1873; application filed April 10, 1872.

*To all whom it may concern:*

Be it known that I, GEORGE W. PARKER, of Gardner, in the county of Worcester and State of Massachusetts, have invented an Improved Speed-Regulator for Machinery, of which the following is a specification:

This invention relates to an improvement in disks or pulleys for regulating and reversing the motion of different kinds of machinery; and it consists in forming a concavity in the center of a movable rotary convex disk or pulley, whereby the motion of the machinery may be regulated or stopped.

Figure 1:
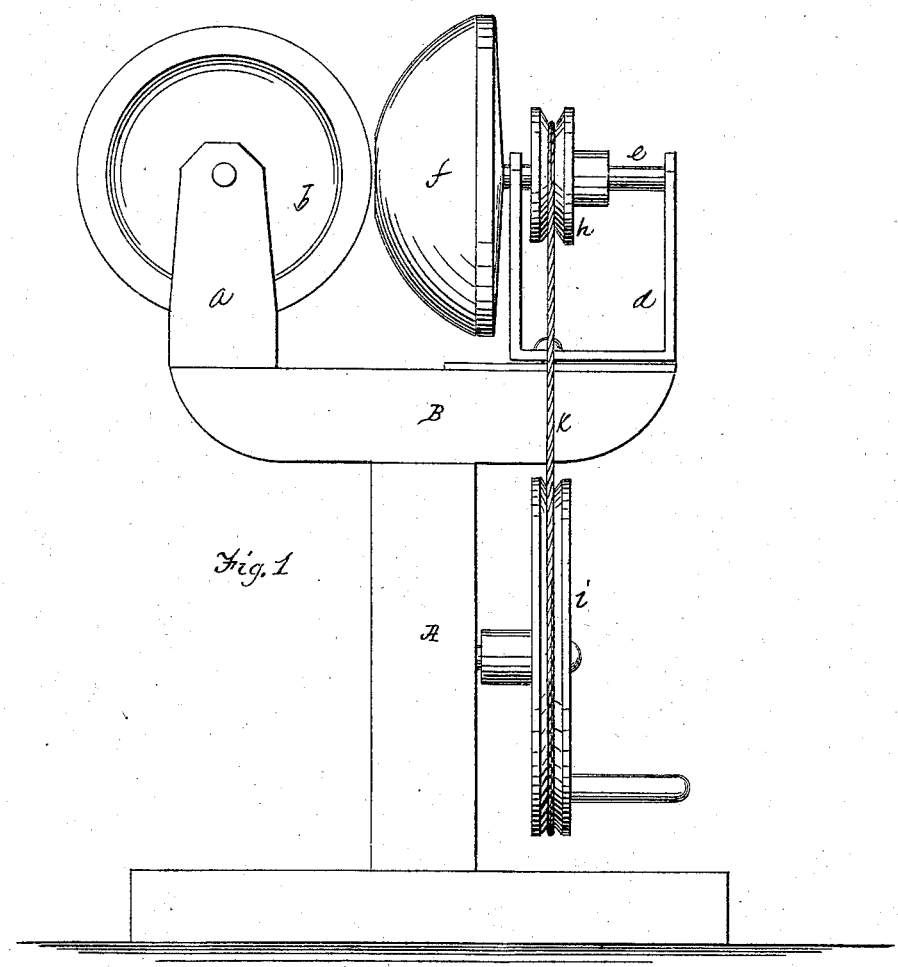
Figure 2:
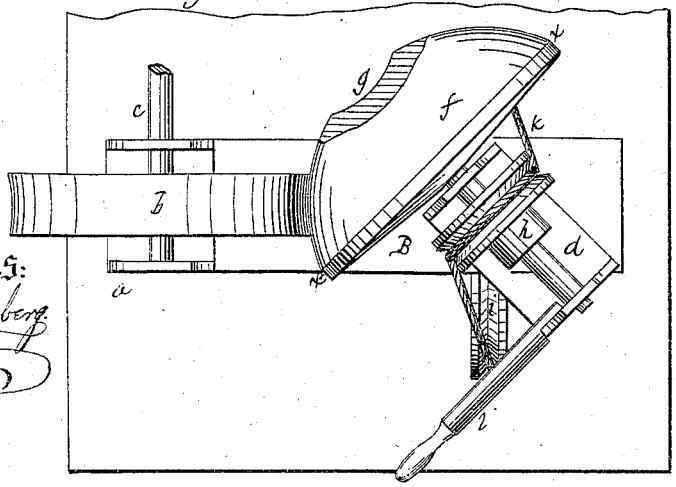

In the drawing, Figure 1 is a side elevation of a device embodying my invention. Fig. 2 is a top-plan view of the same.

The letter A represents a standard having a suitable base and a table, B. In a bracket, $a$, secured to the table a pulley, $b$, is mounted on a shaft, $c$, which has its bearings in said bracket. In a bracket, $d$, pivoted to the table I mount a shaft, $e$, on one end of which is secured a pulley or disk, $f$, the face of which is convex. In the center of the face of this pulley a concavity, $g$, Fig. 2, is made, and motion is imparted to this pulley by any suitable mechanism, as pulleys $h, i$ and a belt, $k$, the pulley $i$ serving as a driving-wheel, if desired. The periphery of pulley $b$ is made concave, and said pulley may be made of wood and its periphery faced with leather, in which case the pulley $f$ will be of metal, or material other than wood, so as to prevent too rapid wear. The rapidity and direction of the motion of the machinery with which this mechanism is connected is regulated by the position in which the pulley $f$ is placed with relation to the pulley $b$. As will be readily understood, if the relative diameters of the pulleys are such that the most rapid motion is obtained when the point of contact is at $x$, then the motion can be diminished or rendered less rapid by bringing the point of contact nearer the center of the disk $f$, and the motion can be stopped by bringing the concavity $g$ opposite the pulley $b$, the disks then being out of contact. If, now, it is desired to reverse the motion the opposite face of the disk $f$ is brought to bear against the pulley $b$. The motion imparted to pulley $b$ may be transmitted through the shaft $c$ to a counter-shaft, or bands and pulleys may be used. A hand-lever, $l$, may be added to the bracket $d$ to facilitate its operation—that is, to bring the proper portion of pulley $f$ in contact with $b$.

As will be understood, this concavity affords a simple, effective, and ready means for stopping machinery.

Having thus described my invention, what I claim as new, and desire to secure by Letters Patent, is—

1. In a speed-regulator, a disk or pulley having a concavity in its center for stopping the motion of machinery, substantially as described.

2. A convex disk or pulley having a concavity in its center, and arranged to reverse the motion of the mechanism to which it is applied, substantially as described.

GEORGE W. PARKER.

Witnesses:
DANIEL D. PARKER,
FRANCIS RICHARDSON.